Patented Oct. 7, 1947

2,428,478

UNITED STATES PATENT OFFICE 2,428,478

ANTIFRICTION MEDIUM FOR PNEUMATIC TIRES

Bernard P. Thurber, Sr., Denver, Colo.

No Drawing. Application March 13, 1945, Serial No. 582,570

1 Claim. (Cl. 252—29)

This invention relates to an anti-friction medium for use in pneumatic vehicle tires.

In the usual vehicle tire there is constant friction between the innertube and the rough internal fabric of the casing due to the flexing of the tire on the road. This friction not only rapidly wears away the innertube but creates internal heat in the tire hastening its disintegration.

The principal object of this invention is to provide an anti-friction medium which can be quickly, easily and economically applied to the tire so as to level off the rough casing interior and act as a lubricant between the tube and the casing to prevent wear and heating of the tube and casing.

Dry innertubes are usually dusted or coated with soapstone or a similar powder to prevent adhesion between the tube and the casing. All such powders are more or less abrasive in their action and result in abrasion and wear on the tube. They also, due to their high specific gravity, tend to collect into piles or cakes between the casing and the tube forming damaging bumps or projections. This improved anti-friction medium forms a filling in all of the low spots and fabric indentations in the casing and forms a slick adhering surface thereover which allows smooth freedom of movement between the tube and the casing without abrasion or wear and without heat forming friction.

The basic ingredient of the improved anti-friction medium is dry, powdered corn starch. The smooth, lubricating qualities of corn starch become readily apparent when rubbed between the thumb and forefinger of the hand. It will be noted that all of the lines, grooves, and pores of the thumb and finger are instantly filled and a smooth, level, frictionless coating is formed thereover.

It has been found that dry lampblack added to the corn starch appears to increase the anti-friction qualities thereof. The most desirable mixture appears to be nine parts of corn starch to one part of lampblack.

The medium may be simply dusted into the casing and over the innertube. It has been found, however, that better results are obtained if the inside of the casing and the outside of the innertube are dampened with water. The medium is then dusted onto the surfaces and spread evenly thereover by hand. The tube is then placed in the casing and the tire is ready for use. The moisture will quickly evaporate, leaving the compound in a uniform film completely surrounding the innertube.

Another method of applying the mixture is to mix it as a thin paste with water, the paste is then painted onto the tire and tube by means of a brush to obtain a uniform distribution thereof. The water quickly evaporates leaving the original ingredients as a dry smooth film between the tire and tube.

Tests appear to indicate that with the use of this medium, the rise in temperature in a tire, due to running conditions, is reduced substantially fifty per cent over any before known medium, such as soapstone.

While preferred forms of the invention have been described in some detail together with the theories which it is believed to best explain its success, it is to be understood that the invention is not limited to the precise procedure described nor is dependent upon the accuracy of the theories which have been advanced. On the contrary, the invention is not to be regarded as limited except in so far as such limitations are included within the terms of the accompanying claims in which it is the intention to claim all novelty inherent in the invention as broadly as is permissible in view of the prior art.

Having thus described the invention, what is claimed and desired secured by Letters Patent is:

An anti-friction compound for use between the innertube and casing of a vehicle tire consisting of nine parts of corn starch and one part lampblack.

BERNARD P. THURBER, Sr.

REFERENCES CITED

The following references are of record in the file of this patent:

UNITED STATES PATENTS

| Number | Name | Date |
|---|---|---|
| 1,429,455 | Rice | Sept. 19, 1922 |
| 1,439,596 | Annert | Dec. 19, 1922 |
| 1,704,446 | Reiter | Mar. 5, 1929 |
| 1,797,580 | Hopkinson | Mar. 24, 1931 |
| 2,299,139 | Grafton | Oct. 20, 1942 |

FOREIGN PATENTS

| Number | Country | Date |
|---|---|---|
| 287 | Great Britain | 1875 |

OTHER REFERENCES

Bennett's Chemical Formulary (1935), vol. I, page 11.